Feb. 17, 1970   M. G. LEONARD ET AL   3,496,420
UNITARY ELECTRICAL POWER SUPPLY FOR INDIVIDUAL POWER CUSTOMERS
Filed Jan. 18, 1968   3 Sheets-Sheet 1

WITNESSES:
Helen M. Farkas
James F. Young

INVENTORS
Merrill G. Leonard &
August I. Keto
BY F. E. Browder
ATTORNEY

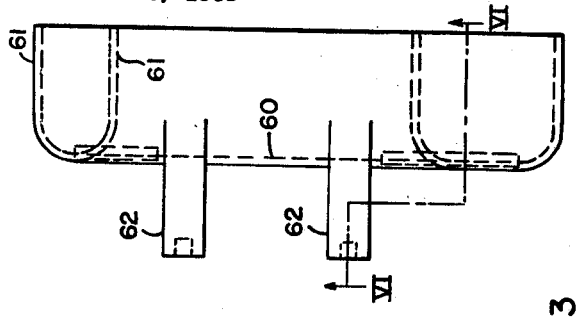
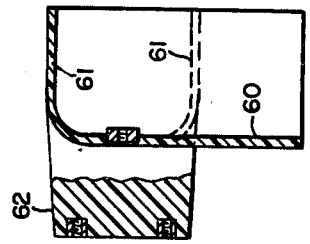
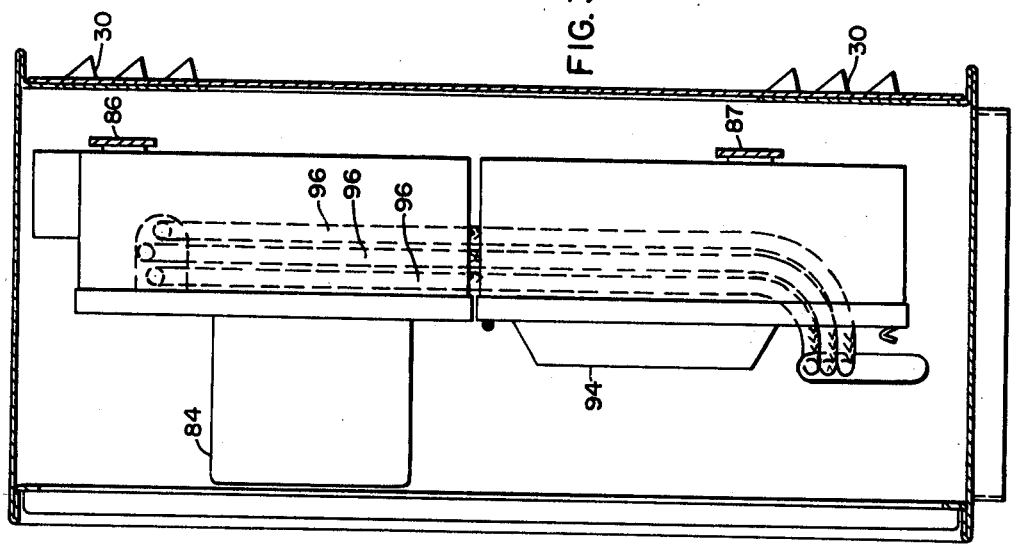
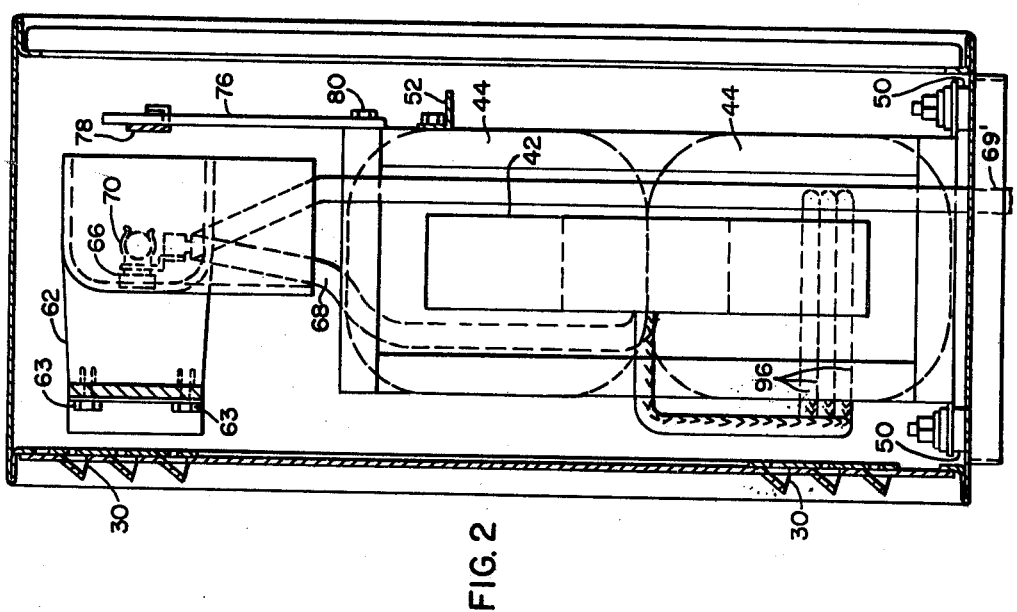

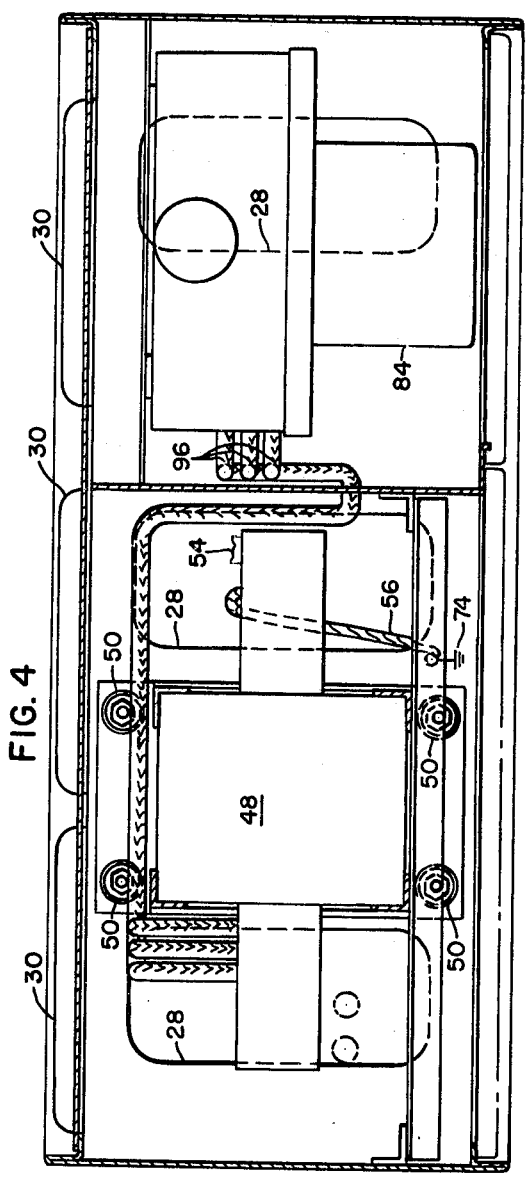
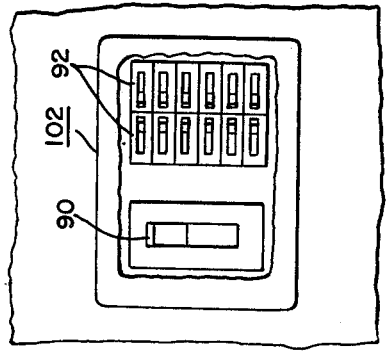
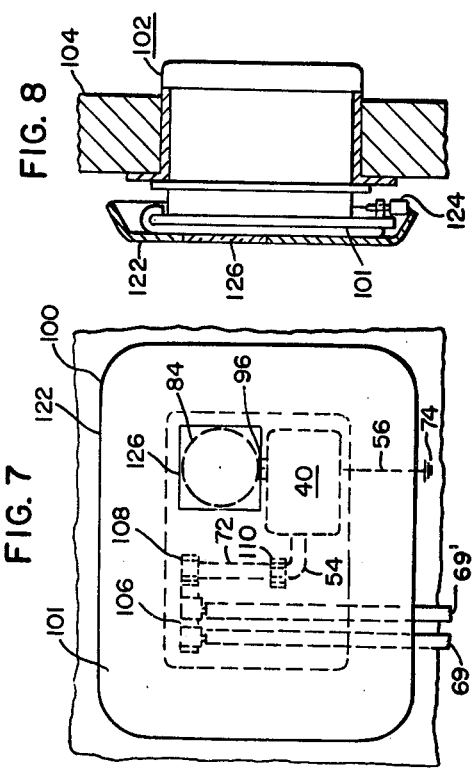
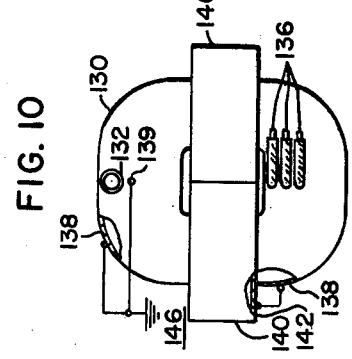
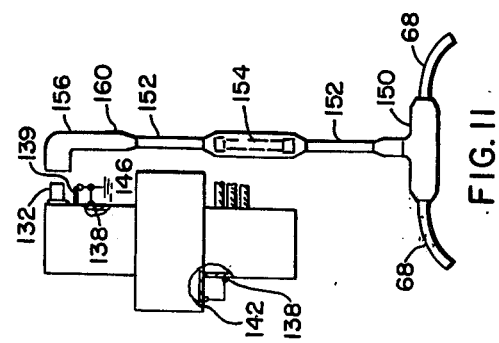

United States Patent Office 3,496,420
Patented Feb. 17, 1970

3,496,420
UNITARY ELECTRICAL POWER SUPPLY FOR INDIVIDUAL POWER CUSTOMERS
Merrill G. Leonard, Fowler, Ohio, and August I. Keto, Sharpsville, Pa., assignors to Westinghouse Electric Corporation, Pittsburgh, Pa., a corporation of Pennsylvania
Filed Jan. 18, 1968, Ser. No. 698,882
Int. Cl. H02b 1/20, 11/06
U.S. Cl. 317—103                                           7 Claims

ABSTRACT OF THE DISCLOSURE

An electrical power supply comprises an enclosure divided into a high voltage compartment containing a cable termination, a transformer and a fuse, and a contiguous low voltage compartment containing a watthour meter, a main secondary circuit breaker or switch and branch line circuit breakers, switches or fuses. The watthour meter may be read from the exterior of the enclosure.

BACKGROUND OF THE INVENTION

Field of the invention

This invention relates to an individual electrical power supply for power customers and more particularly to a separate unitary power supply comprising a transformer, watthour meter and all necessary circuit making and breaking and protective apparatus for each customer, located adjacent to or contiguous to the customer's property.

Description of the prior art

In the prior art power companies have generally used distribution transformers mounted on a pole to serve a number of different customers; the exact number of customers served from each transformer depend upon many factors, mainly, on the distance of separation of the customer's property. This power is usually distributed from the transformer to the customer by means of low voltage cables which carry the power at voltages of 120 or 240 volts. The cost of these low voltage cables is greater than the cost of high voltage cables because of the larger diameter of the conductor required in the low voltage cables. This type of installation has many disadvantages, including esthetic disadvantages, since distribution transformers hanging on poles are unsightly and are considered to detract from or disrupt the natural appearance of the community. Other disadvantages of this type of installation are the high cost of the long runs of low voltage cables and poor voltage regulation at the customer's property because of the long runs of low voltage cables from the distribution transformer hanging on a pole at some distance from the customer's property. The apparatus provided by this invention eliminates the objection to the prior art practice of hanging distribution transformers on poles located at some distance from the customer and also eliminates the long runs of low voltage cable which are expensive and also provides better voltage regulation at the customer's property.

SUMMARY

The apparatus provided by this invention comprises a unitary power supply for each individual customer, comprising a transformer, a cable termination, a protective fuse, a watthour meter and all necessary secondary or low voltage main line circuit protection devices and branch circuit protecting devices such as fuses, circuit breakers, switches and the like in a single unit located closely adjacent to the customer's property.

The apparatus provided by this invention provides a unitary power supply which may be mounted or installed closely adjacent to the customer's property, which will require only one installation fee, and requires very short low voltage or secondary cables running from the power supply to the customer's property. The power supply is intended to be located closely adjacent to the customer's property at ground level or in some cases may be mounted directly through a wall of the customer's property. The power supply provides complete safety from the exterior of the power supply and also provides all necessary controlling devices such as switches, circuit breakers or fuses which are readily accessible to the customer. The power supply may also be serviced and the meter read by the power company without having to have access to the inside of the customer's property. This type of power supply permits a more desirable appearance and is not as unsightly as the conventional distribution transformer hung from a pole in the neighborhood of the customer. It is also more economical to install because it may be installed as a single unit and does not require a separate installation of the transformer, the watthour meter, and the circuit breaker or fuse box, as practiced in the prior art. It is also more economical because it requires a very short run of secondary cables from the power supply to the customer's property. The short secondary cables permits power to be supplied to the customer with much better voltage regulation than in the prior art because the short secondary lead-in cables from the power supply to the customer's property do not cause as much voltage drop as the prior art installations of long lead-in secondary cables. It is therefore seen that the unitary power supply for each individual customer as provided by this invention provides a substantial improvement over the prior art practice of providing power from a power line to an individual customer's property.

BRIEF DESCRIPTION OF THE DRAWINGS

FIG. 2 is a left side elevation, with parts broken away, of the apparatus shown in FIG. 1.

FIG. 3 is a right side elevation, with parts broken away, of the apparatus shown in FIG. 1.

FIG. 4 is a top plan view, with parts broken away, of the apparatus shown in FIG. 1.

FIG. 5 is a detail view of a high voltage cable termination insulator used in the apparatus shown in FIGS. 1, 2, 3 and 4.

FIG. 6 is a sectional view taken along line VI—VI of FIG. 5.

FIG. 7 is a front plan view of a second embodiment of the apparatus as provided by this invention.

FIG. 8 is a side view with parts broken away, of the apparatus shown in FIG. 7.

FIG. 9 is a rear plan view of the apparatus shown in FIG. 7.

FIG. 10 is a plan view of an alternate transformer core and coil arrangement; and, FIG. 11 is a schematic view illustrating a method of connecting a high voltage cable to the core and coil assembly of FIG. 10.

DESCRIPTION OF THE PREFERRED EMBODIMENTS

Figure 1:
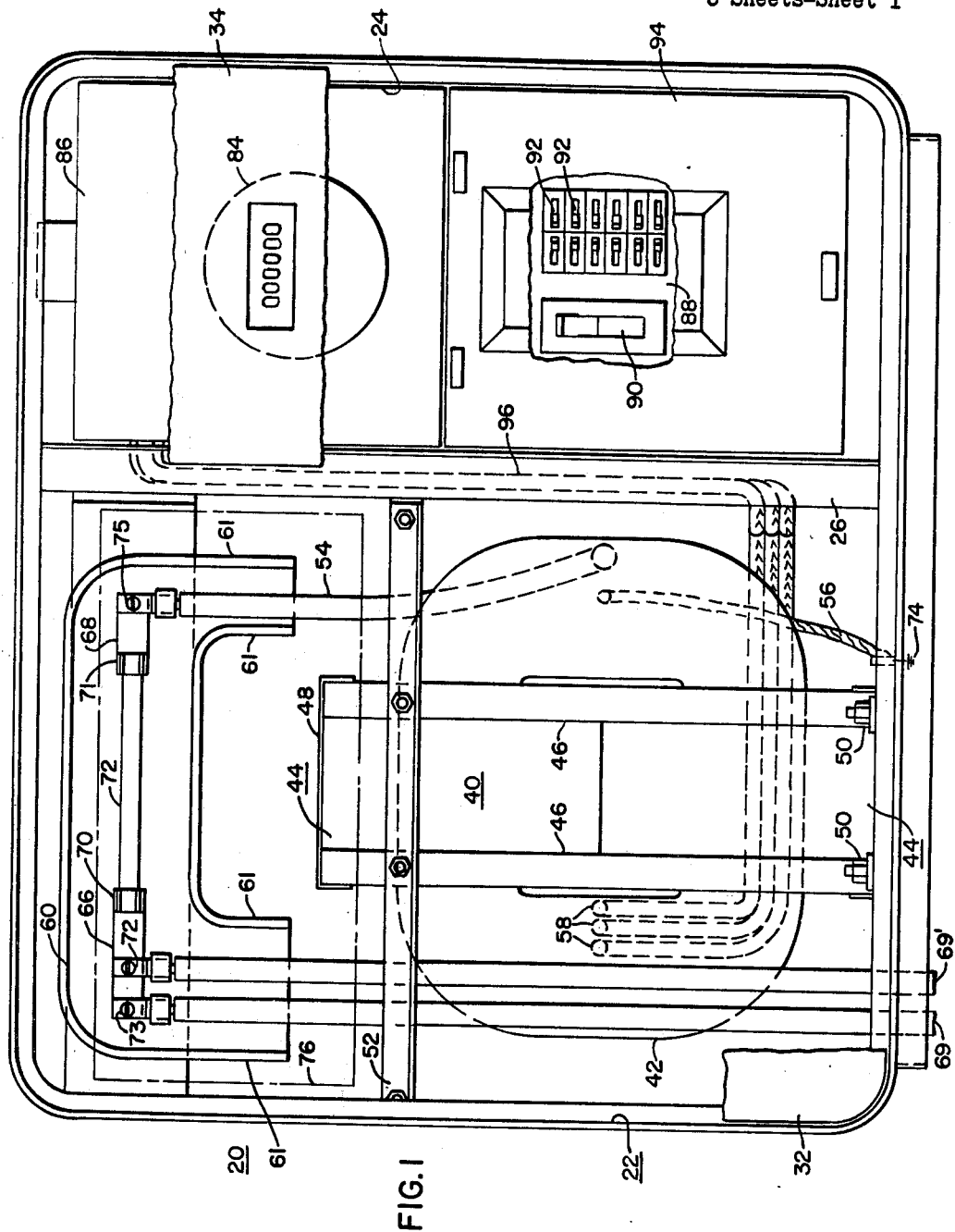
FIGURE 1 is a front elevational view, with parts broken away, of a unitary power supply as provided by this invention.

Throughout the description which follows identical reference characters refer to like elements in all figures of the drawings.

Referring specifically to FIGS. 1, 2, 3 and 4 of the drawings, a unitary power supper 20 is shown. The power supply 20 comprises a casing or housing divided into a high voltage compartment 22 and a contiguous or immediately adjacent low voltage compartment 24. The casing or housing is constructed from metallic material and a metallic divider member 26 is provided to divide the compartment into the separate high voltage compartment 22 and the low voltage compartment 24. A series of openings 28 are provided in the bottom of the container for housing the power supply and a series of louvers 30 are provided in the rear wall of the compartment. The openings 30 serve to admit cooling air which may be exhausted through the louvers 30 and also function to permit power cables to be brought into the casing or housing through the bottom thereof.

The front of the high voltage compartment 22 is completely covered by a removable metallic cover 32. The entire front of the low voltage compartment 24 is covered by a removable metallic cover 34. The cover 32 on the high voltage compartment is locked with a padlock and this lock cannot be removed until after the low voltage compartment cover 34 has been removed from the low voltage compartment 24.

A transformer 40, comprising a coil assembly 42 and a pair of cores 44, is provided in the high voltage compartment 22. The transformer 40, comprising the coil 42 and the cores 44, is assembled and held together by a frame structure comprising four angle members 46 and a top plate 48. The transformer 40 is mounted by means of the angle members 46 on shock absorbers 50, which shock absorbers rest on the bottom of the high voltage compartment 22 of the power supply.

A cable terminating insulator 60 is mounted to the back wall of the high voltage compartment 22 by means of a pair of brackets 62 and bolts 63. The high voltage cable terminating insulator 60 is shown in detail in FIGURES 5 and 6. The high voltage cable terminating insulator 60 has sides 61 which are deep enough to provide a hollow trough for the cable terminating means and provide ample insulation to prevent creepage from the high voltage terminals to the other parts of the high voltage compartment. The walls or sides 61 of the cable terminating insulating means 60 are thick enough to withstand any puncture stresses which might be encountered in this type of power supply system. The high voltage cable termination insulating member 60 is molded from some good insulation material, such as for example a filled epoxy resin.

First cable terminating means 66 is mounted inside the trough and near one end of the insulating means 60. This cable terminal means 66 carries a fuse clip 70. A second terminal means 68 is mounted inside the trough and near the opposite end of the cable terminating means 60 and this terminal means 68 carries a fuse clip 71. A current limiting fuse 72 is mounted in the fuse clips 70 and 71. The high voltage cables 69 and 69′ of a power line, entering and leaving the high voltage compartment 22, are attached to the first cable terminating means 66 by means of screws 72 and 73. The high volage lead 54 of the transformer 40 is connected to the terminal 68 by means of a screw 75. The second high voltage lead 56 of the transformer 40 is connected to ground potential, as indicated at 74.

The low voltage terminals 58 from the transformer 40 are connected by means of low voltage conductors 96 into the low voltage compartment 24 where the conductors 96 connect to watthour meter 84. The watthour meter 84 connects to the circuit making and breaking equipment 90 through an extension of the low voltage cables 96.

The front of the high voltage cable terminating insulator member 60 is covered with an insulated board member 76. This board member 76 is also made from a good electrical insulating material which is thick enough to withstand any puncture stresses which might be encountered in this type of power supply system. The board 76 is hung from a hook 78 and also attached to the transformer frame by means of a bolt 80.

It is seen that the high voltage terminal insulator 60 and the insulating board 76 provides complete insulation for the high voltage cable terminating means, which will prevent creepage from the high voltage terminals to other parts of the high voltage compartment and also will protect service personnel from accidentally getting on the high voltage terminals when the front cover 32 of the high voltage compartment 22 is removed.

The contiguous low voltage compartment 24 of the power supply contains a watthour meter 84 which is mounted in the compartment 24 on a support member 86 and circuit controlling equipment 88 which is mounted in the compartment 24 on a support member 87. The circuit controlling equipment 88 comprises a main secondary breaker 90 and a plurality of branch circuit breakers 92. The circuit making and breaking equipment 88 is covered by an additional cover 94 which must be opened up to expose the circuit making and breaking equipment 88 after the main cover 34 has been removed from the low voltage compartment.

The low voltage terminals 58 of the transformer 40 are connected from the high voltage compartment 22 of the transformer compartment to the watthour meter 84 through low voltage leads 96. The circuit is continued from the watthour meter 84 down to the circuit making and breaking equipment 88 through a continuation of the low voltage leads 96. It is seen from this description that with this power supply all of the necessary equipment to connect from a power line to a customer's house is contained in this unitary structure which requires a minimum amount of low voltage cable to connect from the power line to the customer's house and also requires only one installation, instead of a separate installation of a transformer, a watthour meter, and circuit making and breaking center, as practiced in the prior art.

With the apparatus described hereinbefore for FIGS. 1, 2, 3 and 4 the power supply would normally be installed at ground level and very close to the customer's house, only a few inches from the customer's walls, and the branch line circuits would be brought through the customer's wall and brought into power supply through one of the openings 28 and attached to branch line circuit making and breaking equipment 92.

In the apparatus shown in FIGS. 1, 2, 3 and 4 a transparent insert (not shown) is provided in the cover 34 of the low voltage compartment so that service personnel may read the watthour meter 84 without opening any doors.

FIGS. 7, 8 and 9 show a second embodiment of a unitary power supply for supplying power from a power line to an individual customer. In the embodiment shown in FIGS. 7, 8 and 9 the power supply comprises a unitary housing 100 having a front compartment 101 and a rear compartment 102. In this embodiment the front compartment 101 is the high voltage compartment and the rear compartment 102 is the low voltage compartment. This apparatus mounts through a wall 104 of the customer's property so that the high voltage compartment 101 extends exteriorly of the customer's property and the rear compartment 102 extends interiorly of the customer's property.

The high voltage compartment 101 contains a high voltage cable terminating means 106 to which high voltage cables 69 and 70 from a power line are connected as described for the previous embodiments. One end of this cable terminating means is attached to a fuse clip 108 and another fuse clip 110 is attached to the high voltage lead 54 of a transformer 40. A current limiting fuse 72 is attached in series circuit relationship with the fuse clips 108 and 110. The transformer of this embodiment is similar to the transformer described hereinbefore for FIGS. 1, 2, 3 and 4, with the high voltage lead 54 attached to the incoming high voltage line 68 through the current limiting fuse 72 and the cable terminating means 106 and with the other high voltage lead 56 connected to ground potential at 74. The secondary terminals from the transformer connect directly to the watthour meter 84 through short secondary leads 96. The watthour meter 84 is in the front or high voltage compartment 101 of the power supply. The front of the power supply is covered with a removable cover 122 which is locked in place with a padlock 124. The cover 122 has a glass or transparent portion 126 therein which permits reading of the watthour meter 84 from the exterior of the power supply without removing the cover 122.

The rear compartment 102 of the power supply extends into the customer's property and it contains a main secondary line circuit breaker 90 and a plurality of branch line breakers 92. The circuit breakers 90 and 92 may be operated by the customer from the interior of his house or property.

It is seen from the description of FIGS. 7, 8 and 9 that this invention provides a unitary power supply which may be mounted through a customer's walls with the necessary high voltage protection exteriorly of the customer's property wherein the watthour meter may be read from the exterior of the customer's property and the secondary circuits and branch circuits may be controlled by the customer from the interior of his property. The power supply is economical to install because of the minimum amount of secondary cable required and also because in order to install the complete power supply it is only necessary to install one piece of apparatus, consequently only one installation fee is required.

FIGS. 10 and 11 illustrate schematically a core and coil arrangement which may be used with all of the embodiments of the power supply described herein. A coil 130 is shown which comprises concentric high and low voltage windings. The high voltage terminals are indicated at 132 and 139. The coil also has terminals connected to the low voltage windings which are indicated at 136.

The high voltage and low voltage windings of the coil are wound concentrically and then the entire coil is cast in a resin composition, for example a filled epoxy resin, to provide weather proofing and mechanical protection and electrical insulation for the coil. The high voltage terminals 132 and 139 are molded in during this casting process. After the coil is cast in the resin composition, the resin housing is completely coated with a conductor such as a sprayed on metallic conductor or a conducting paint, as indicated at 138.

In FIGS. 10 and 11 two cores 140 are shown linked with the coil 130. The cores 140 are also covered with an electrical conducting material to provide a complete shield for the cores 140. This shield is indicated at 142 and it may be of the same type as the conducting shield 138 provided for the coil 130. The shield 142 of the cores is electrically connected to the shield 138 of the coil 130 and the shields are connected to ground potential as indicated at 146. As seen from this description the entire core and coil assembly is shielded by the conductive coatings 138 and 142 and grounded so that at all times the surface of the core and coil assembly is at ground potential.

FIG. 11 illustrates how power from a high voltage line 68 is connected to the core and coil assembly. The line 68 is tapped by means of a T connector 150 and a high voltage cable 152 is connected to the T connector 150. The high voltage cable 152 has a current limiting fuse 154 connected in series therewith to provide high voltage protection to the transformer. A plug-in elbow connector 156 is connected to the upper end of the cable 152. This elbow connector 156 carries an electrical connector which makes connection with the molded-in high voltage terminal 132. The high voltage cable 152 and the elbow connector 156 have a metallic coating, such as conducting paint or a sprayed on metallic coating 160 thereon. When the elbow connector 160 is placed on the molded-in high voltage terminal 132 to make proper electrical connection thereto, the conducting coating 160 on the elbow 156 makes good electrical contact with the metallic coating 138 of the coil 130 to insure that the entire system comprising the high voltage cable and the core and coil assembly is properly grounded.

The current limiting fuse shown herein may be of the type disclosed in U.S. Patent 3,134,874.

From the foregoing description taken in connection with the drawings it is seen that this invention has provided a unitary power supply for supplying electrical power from a power line to an individual customer which is more economical in capitol investment than the prior art supplies, wherein the power is supplied to a plurality of customers from a single distribution transformer by means of long low voltage leads, and an individual watthour meter, and circuit making and breaking equipment is installed at the customer's property. This invention also provides a safe power supply and one which may be maintained with minimum inconvenience to the power company service people and also to the customer.

We claim:
1. A power supply comprising an enclosure, said enclosure comprising a high voltage compartment and a low voltage compartment, a high voltage cable in said high voltage compartment, a transformer having high voltage and low voltage windings in said high voltage compartment, cable terminating means comprising an insulating trough having a pair of fuse clips mounted therein, said trough having an open front, an insulating front closure for said trough, said trough and said closure providing an insulating enclosure for said cable terminating means comprising said fuse clips, fuse means in said trough and connected to said pair of fuse clips in series circuit relationship between said high voltage cable and said high voltage winding of said transformer, circuit making and breaking means in said low voltage compartment, and means connecting said low voltage winding of said transformer to said circuit making and breaking means.

2. A power supply as specified in claim 1 wherein said fuse means is a current limiting fuse.

3. A power supply as specified in claim 1 wherein said low voltage compartment contains a watthour meter connected in circuit relationship with said low voltage windings of said transformer and said circuit making and breaking means.

4. A power supply as specified in claim 1 wherein said circuit making and breaking means comprises means for making and breaking a main line circuit and means for individually making and breaking branch line circuits.

5. A power supply as specified in claim 1 wherein said high voltage and low voltage windings are associated with a magnetic core and conductive shielding means surrounds said windings and said core, and means for connecting said shielding means to ground potential.

6. A power supply as specified in claim 1 wherein said high voltage compartment and said low voltage compartment of said enclosure are positioned in side-by-side relationship and said watthour meter and said circuit making and breaking means are accessible from the front of said low voltage compartment.

7. A power supply as specified in claim 1 wherein said high voltage compartment is positioned in front of said low voltage compartment and a watthour meter is accessible from the front of said high voltage compartment and circuit making and breaking means is accessible from the rear of said low voltage compartment.

References Cited

UNITED STATES PATENTS

| | | | |
|---|---|---|---|
| 1,816,034 | 7/1931 | Wood | 317—120 |
| 2,198,489 | 4/1940 | Snyder | 317—103 X |
| 2,917,677 | 12/1959 | Washil | 317—103 X |
| 3,290,634 | 12/1966 | Stevens | 336—84 |
| 3,393,388 | 7/1968 | Young | 336—84 |

LEWIS H. MYERS, Primary Examiner

G. P. TOLIN, Assistant Examiner